United States Patent [19]

Spirig

[11] 4,323,631
[45] Apr. 6, 1982

[54] SOLDER REMOVING DEVICE

[76] Inventor: Ernst Spirig, CH-8640 Rapperswil, Switzerland

[21] Appl. No.: 201,228

[22] Filed: Oct. 27, 1980

[30] Foreign Application Priority Data

Sep. 5, 1980 [GB] United Kingdom ............ 28819/80

[51] Int. Cl.³ .............................................. B23P 17/06
[52] U.S. Cl. ....................................... 428/605; 228/19
[58] Field of Search ............................ 428/605; 228/19

[56] References Cited

U.S. PATENT DOCUMENTS

| 2,616,165 | 11/1952 | Brennan | 428/605 |
| 3,627,191 | 12/1971 | Hood, Jr. | 228/19 |
| 4,081,575 | 3/1978 | Spirig | 228/19 |
| 4,164,606 | 8/1979 | Spirig | 428/605 |

FOREIGN PATENT DOCUMENTS 1-921  5/1979  European Pat. Off. .............. 228/19

Primary Examiner—Brooks H. Hunt
Attorney, Agent, or Firm—Laubscher, Philpitt & Laubscher

[57] ABSTRACT

A solder removing device is disclosed including fibres of temperature-resistant non-metallic material, such as a synthetic polymeric material, for example FEP or PTFE, which are coated with a metal rendering them more receptive to solder flux. The metallized fibres are coated with solder flux rendering them more capable of wetting with molten solder, interstices between the fibres serving to absorb molten solder by capillary attraction.

12 Claims, 3 Drawing Figures

SOLDER REMOVING DEVICE

BRIEF DESCRIPTION OF THE PRIOR ART

This invention relates to a solder removing device for use in absorbing, by capillary attraction, solder which has been made molten by heating when it is desired to break a soldered connection, for example in an electronic circuit.

Solder removing wicks or braids are known (for example, my U.S. Pat. No. 4,081,575) comprising fine copper wires braided together and coated with a solder flux (for example rosin) to improve the capability of the wires to be wetted by the molten solder. In the solder removing wick of my U.S. Pat. application Ser. No. 849,616 (European application No. 783005838) now Pat. No. 4,164,606 each copper wire is provided with an alloy coating. In any event, known solder removing wicks use a considerable quantity of copper, which is discarded and can no longer be used after the wick has become filled with absorbed solder. Copper is expensive and a limited world resource, so that its substantial use in the solder removing wicks is a disadvantage of those wicks.

Also, in forming solder removing wicks, braiding machines are used. Such machines are well suited to textile making processes, but not so well suited to copper (or other metal) strands, and braiding of the metal fibres is not easy. In particular, it is necessary to use a lubricant to minimize friction and wear between the copper fibres and the braiding machine. Residues of the lubricant remaining on the copper fibres have to be removed before the braid can be coated with the flux. This is to avoid interaction of the lubricant with the flux and a consequent reduction in the wetting capability of the flux, and also to avoid possible contamination of the printed circuit boards on which the wick is subsequently used leading to unwanted conductivity paths on or corrosion of the printed circuit board. The cleaning of the wick to remove the lubricant involves an additional process increasing the costs of manufacturing the wick.

Hitherto, solder removing devices have been in the form of elongate wicks or braids. Modern-day trends in electronic components involve a considerable increase in the number of pins on the component, all soldered to conductive paths on the printed circuit board. Several years ago, integrated circuits commonly has 14 pins maximum, the number increased to 16 and to-day there are microprocessor circuits with 32 or more pins. In the case of failure of such a component, requiring its removal and replacement, it is a multi-step process to effect the desoldering. First, an appropriately shaped solder tip is applied to the pins on the soldered side of the board, to melt the solder of all pins simultaneously. The integrated circuit component may then be removed from the opposite side of the board, but this leaves the board with its pin apertures still filled with solder, which quickly re-solidifies. Then it is necessary to heat the solder in the pin apertures, and apply the desoldering wick to those apertures, one-by-one and this is a time consuming operation. Also, it involves putting the circuit board through repetitive heat cycles (as the heat applied to any one pin aperture will also affect the adjacent pin apertures). Such repetitive heat cycles are liable to damage the circuit board.

Accordingly, an appropriate pad-shaped solder removing wick suggests itself, which could be pressed against all pins simultaneously during the first heating process (namely, the application of the shaped solder tip to effect melting of the solder of all pins simultaneously). If the pad is soft and deformable so as to adapt itself to the projecting pins it would effectively remove all solder from all pins simultaneously, with just a single application of heat. However, copper or other metal fibres are too stiff and a pad formed from them would not be satisfactory. Moreover, there would be a considerable waste of the expensive copper, because only the opposite edges of the pad, adjacent the two rows of component pins, would absorb solder, the remaining central area of the pad being unused.

SUMMARY OF THE INVENTION

In accordance with this invention, there is provided a solder removing device comprising fibres of temperature-resistant non-metallic material which are coated with a metal rendering them more receptive to solder flux, the metallized fibres being coated with solder flux rendering them more capable of wetting with molten solder, interstices between the fibres providing for absorbing molten solder by capillary attraction.

Suitable non-metallic materials for the fibres include, for example, high melting synthetic polymeric materials such as TEFLON (trade mark), polytetrafluoroethylene, other fluoroethylene polymers (including copolymers), VESPEL (trade mark) which is a polyimide, KAPTON (trade mark) which is a polyimide derived from pyromellitic acid, and other materials such as glass fibres. Such materials can be exposed to the temperatures of molten electronic-grade soft solder alloys. Du Pont technical literature states that TEFLON can be exposed to 316° C. for short times without influence on its material properties, and fibres of this material in the form of a desoldering device in accordance with this invention can be put to even higher temperatures, because the heated material is filled with solder and discarded.

TEFLON fibres are available in non-filament or multi-filament form and either can be used for the desoldering device.

Metallization of TEFLON is known in connection with other arts (for example, to permit soldering together of two TEFLON parts in coaxial high frequency conductors) and well documented in the literature relating to TEFLON. The metallization of TEFLON fibres is necessary in the desoldering device because TEFLON is itself not wetted by solder. The metallization may comprise one or more layers of metal, finishing with an outer coating of copper or tin or some other metal or alloy readily wetted by molten solder.

For example, TEFLON may be metallised by the deposit of metal ions in a liquid phase or under vacuum by evaporation of metal actions onto the TEFLON surface. Beforehand, the TEFLON surface must be prepared, for example chemically etched or bombarded with ions or electrons.

The non-metallic fibres (whether mono-filament or multi-filament) may be metallised either before braiding or weaving or stranding together, or afterwards, or a first metallization may be carried out before braiding, weaving or stranding together and a second metallization carried out afterwards.

The fibres need not be braided, woven or stranded together, but may instead be arranged in matted, non-woven form. In order to form a non-woven fabric of TEFLON, for example, they must be rendered less slippery so as to interlock. In the case of metallised fibres, interlocking may be achieved by spraying the loose, metallised fibres (for example passing along a conveyor belt) with the flux (e.g. rosin) in a solution, with subsequent drying (see my U.S. Pat. No. 4,081,575). The rosin effectively glues the fibres together.

Glass fibres are also an appropriate material and they also can be metallized. Technologies already exist for forming non-woven pads of glass fibres, and can be used whether the fibres are metallized prior to forming into the pad, or afterwards, or whether there are metallization processes both beforehand and afterwards. As one example a pad of non-woven glass fibres may be metallized with aluminum by vacuum deposition, then metallized with copper or tin or an alloy, and finally sprayed with or dipped in rosin flux and dried.

Glass is a very widely available raw material, highly resistant to such temperatures found in soft soldering and chemically inert. Desoldering devices formed of this material can therefore be produced very much less expensively than corresponding devices of copper. Indeed, the device when formed from glass fibres can be used for hard soldering (with appropriate flux) because it can withstand the temperatures encountered therein.

Reference has been made to producing desoldering devices in accordance with this invention in pad form (although they may still be made, if required, in the prior art elongate wick form). It will be appreciated that, in the pad form, the device could be applied to cover all pins of an electronic component, adapting (because of its softness and deformability arising out of the material of the fibres) to optimum contours around the pins and thus effectively absorbing the solder from all pins simultaneously when the solder of all these pins is melted by a single application of an iron to all pins.

BRIEF DESCRIPTION OF THE DRAWING

Embodiments of this invention will be further described, by way of example only with reference to the accompanying drawings, in which.

DETAILED DESCRIPTION

Figure 1:
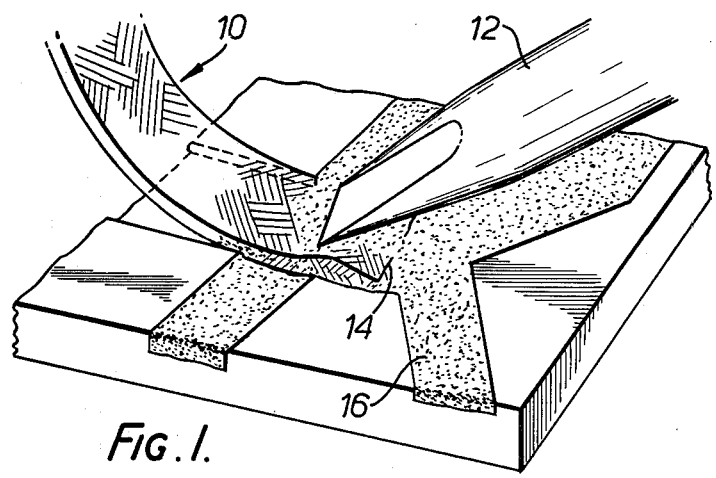
FIG. 1 shows an elongate form desoldering device being used in a desoldering operation.
Figure 2:
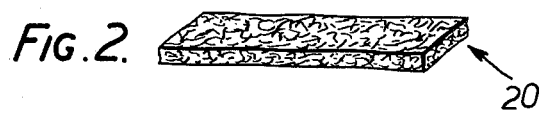
FIG. 2 shows a pad form desoldering device.
Figure 3:
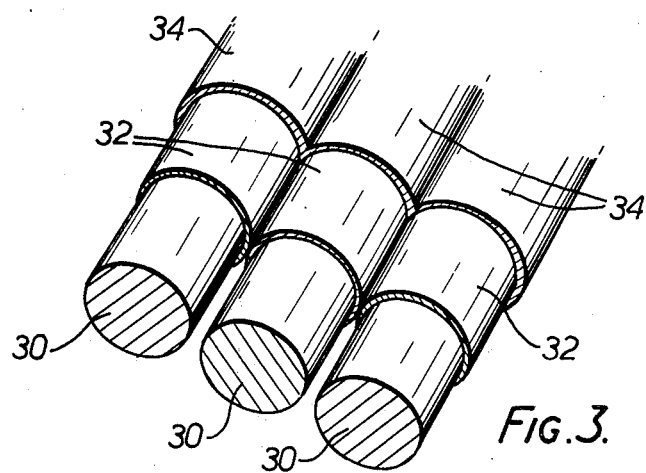
FIG. 3 shows, much enlarged, a number of adjacent fibres typically to be found in either of the above devices.

FIG. 1 shows an elongate form desoldering device 10, comprising fibres braided or stranded together, being used in a de-soldering operation being performed on an electronic circuit board. A heated soldering iron 12 is being used to melt solder 16 on the circuit board and the end of the desoldering device is applied to the molten solder to absorb this by capillary attraction. FIG. 2 shows a pad form desoldering device 20 of non-woven fibres, for use in simultaneously absorbing molten solder from the plurality of pins of an electronic chip (as previously described). As shown in FIG. 3, both the device of FIG. 1 and the device of FIG. 2 comprises a plurality of fibres 30 of temperature-resistant non-metallic material (for example any of the materials mentioned previously herein) coated with metal at 32, the metallised fibres being coated with solder flux 34.

I claim:

1. A solder removing device, comprising
   (a) a group of fibers (30) formed from a temperature-resistant non-metallic material;
   (b) at least one layer of metal (32) metallizing said fibers; and
   (c) a layer of solder flux (34) coating the metallized fibers, thereby to render the fibers more capable of wetting with molten solder, whereby the interstices between the fibers serve to absorb molten solder by capillary attraction.

2. A device in claim 1, in which the flux is rosin.

3. A device is claimed in claim 1, in which the non-metallic material is a synthetic polymeric material.

4. A device as claimed in claim 3, in which the synthetic polymeric material is a fluoroethylene polymer.

5. A device as claimed in claim 3, in which the synthetic polymeric material is a polytetrefluoroethylene.

6. A device as claimed in claim 1, in which the non-metallic material is glass fibre.

7. A device as claimed in claim 1, in which the group of fibres are disposed together in non-woven form.

8. A device as claimed in claim 7, in which the fibres are adhered together by the flux.

9. A device as claimed in claim 1, in which the fibres are woven, braided or stranded together.

10. A device as claimed in claim 1, wherein said device is in the form of a pad.

11. A method of forming a solder removing device, which comprises the steps of
    (a) grouping together a plurality of fibers formed from a temperature-resistant non-metallic material;
    (b) coating the fibers with at least one layer of metal, thereby to metallize the fibers and render them more receptive to solder flux; and
    (c) coating the metallized fibers with solder flux (34).

12. A method as defined in claim 11, wherein the fiber coating step precedes the grouping step; and
    (d) further including the step of coating the metallized fiber group with a second metal layer (32).

* * * * *